C. H. AYARS.
CAN CAP TIPPING MACHINE.
APPLICATION FILED FEB. 8, 1906.
948,963.
Patented Feb. 8, 1910.
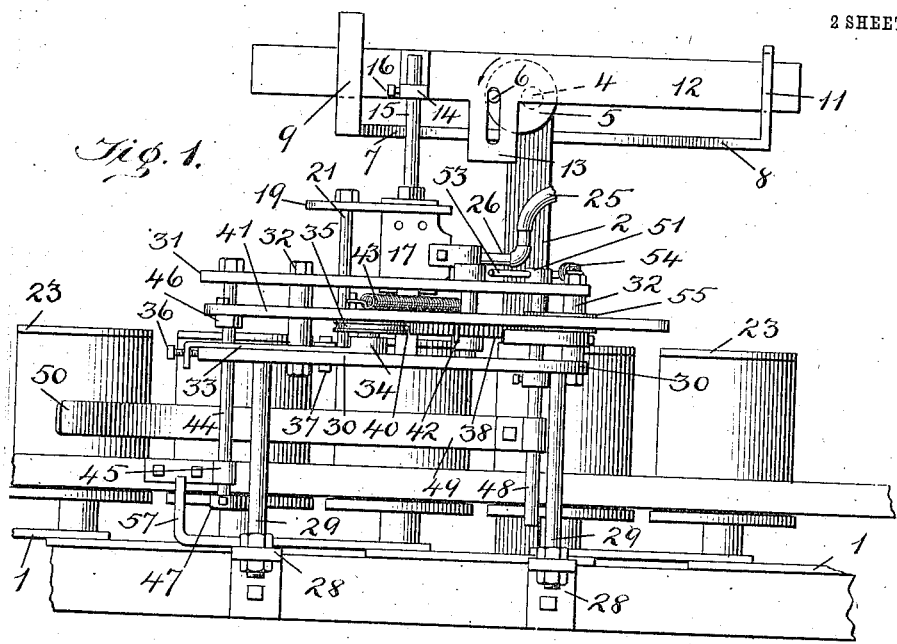
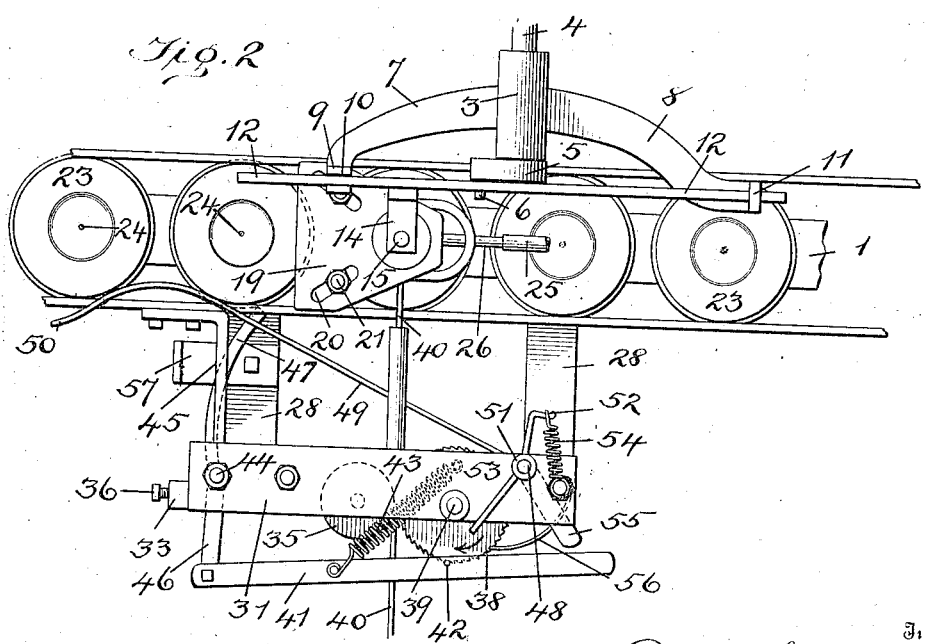
Witnesses
Edwin L. Bradford
G. Ferdinand Vogt
Inventor
Charles H. Ayars
By Mann & Co,
Attorney

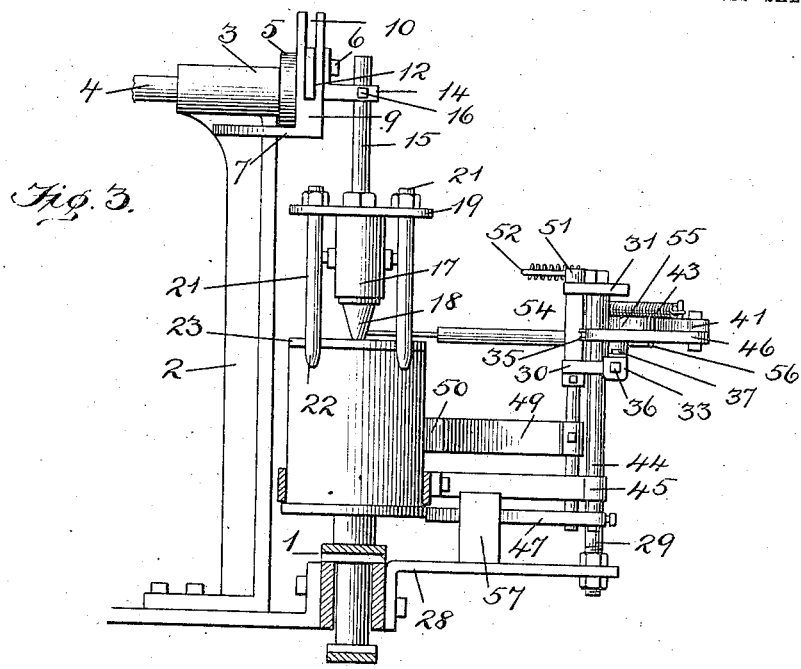
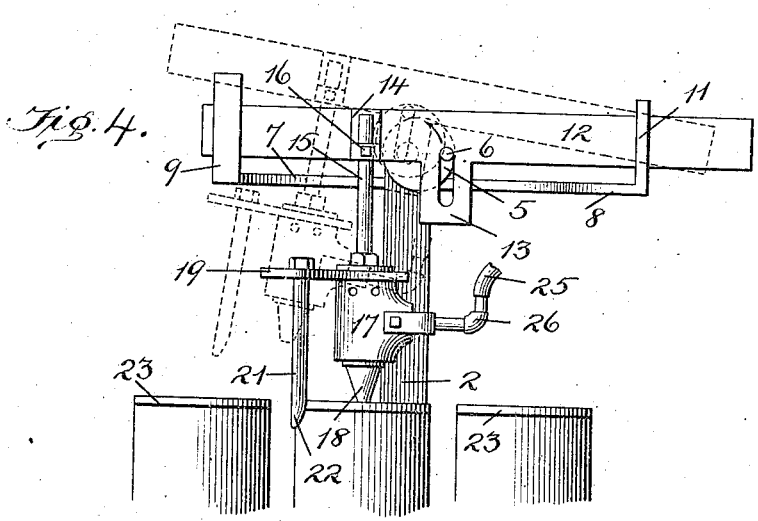

UNITED STATES PATENT OFFICE.

CHARLES H. AYARS, OF SALEM, NEW JERSEY, ASSIGNOR TO AYARS MACHINE COMPANY, OF SALEM, NEW JERSEY, A CORPORATION OF NEW JERSEY.

CAN-CAP-TIPPING MACHINE.

948,963.  Specification of Letters Patent.  Patented Feb. 8, 1910.

Application filed February 8, 1906. Serial No. 300,157.

*To all whom it may concern:*

Be it known that I, CHARLES H. AYARS, a citizen of the United States, residing at Salem, in the county of Salem and State of New Jersey, have invented certain new and useful Improvements in Can-Cap-Tipping Machines, of which the following is a specification.

This invention relates to a can-cap tipping machine employed in sealing by solder the holes in the can-caps which holes are provided for the purpose of venting during the operation of soldering the cap to the can. This "tipping" operation is the final step in hermetically sealing cans, because after the cap itself has been soldered sufficient time must be allowed, after the can leaves the heated soldering iron of the capper, for the soldered cap to cool before the tipping can be properly accomplished.

In the art of packing materials in cans by the use of machinery it is desirable that the handling of the cans be reduced to a minimum, and for this reason the mechanism which effects the tipping is preferably so located with respect to or connected with the capping machine that the cans after being capped will be mechanically conveyed to the "tipper."

One object of the present invention is to provide soldering mechanism having a tipping iron which will have position adjacent to the path along which the capped cans travel and to cause the tipping iron to move through a complete vertical circuit so as to tip a can during the movement of said iron through a part of its circuit, and to continue the circuit so as to meet the next approaching can.

Another object of the invention is to provide a construction of tipper that shall be simple, entirely automatic in its operations so as to effect the proper registration of the soldering iron with the vent-hole of the cap, and which will feed the solder or not feed it according to the presence or absence of a can on the can-seat of the conveyer.

The invention is illustrated in the accompanying drawings in which,—

Figure 1 shows a side elevation of the machine. Fig. 2. a plan view of the same. Fig. 3. an end elevation of the same, and Fig. 4, is a side elevation showing a detail of the tipping iron devices.

In the drawings, 1, designates a can carrier or conveyer which may be of any well-known form, but which in practice forms a part of a can-cap soldering machine. This conveyer, in the present instance has a plurality or endless series of can-seats on which the cans are originally placed and where they remain until the complete closure of the can is effected.

At one side of the conveyer, and secured to a suitable portion of the frame structure, is a vertically extending standard, 2, having a bearing, 3, at its upper end through which a horizontal shaft, 4, extends. The end of this shaft carries a crank, 5, having a laterally-projecting pin, 6.

Two laterally-curved bracket-arms, 7, and, 8, project from the standard at opposite sides of the bearing, 3, and the ends of these arms extend over and in a vertical plane above the conveyer. The extreme end, 9, of the arm, 7, turns upwardly and is provided with a vertical slot, 10, while the end, 11, of the arm, 8, also projects vertically and forms a slotted guide.

A bar, 12, has one end projecting through the guide, 11, and its other end drops loosely in the slot of the arm, 9. Between its ends this bar is provided with a downwardly-projecting arm, 13, having a vertical slot into which the pin, 6, of the crank projects. When the bar, 12, is in the horizontal position as seen in Fig. 1, the crank-pin, 6, has position at the upper end of the slot and it is obvious that if the crank is turned in the direction of the dart in Fig. 1, the bar will be made to slide horizontally through the ends, 9, and, 11, of the bracket arms. It is this movement of the bar that I utilize to travel with the cans during the tipping operation.

A bracket, 14, is secured to the side of the bar and projects outwardly over the center of the conveyer and the outer end of this bracket is provided with a perforation through which a vertical rod, 15, extends and is adjustably secured by a set screw, 16. The lower pendent end of this rod carries a tipping iron, 17, having a point-end, 18, which registers with the center line of the conveyer which is below it.

A horizontal plate, 19, extends laterally from above the iron and said plate is provided with a plurality of diverging slots, 20. Pins, 21, are adjustably secured in the slots of said plate and by adjusting them therein their lower beveled-ends, 22, will engage the circumferential edge of the can-heads, 23, on the conveyer. By this means the cans on the conveyer will become centered so that the point-end, 18, of the tipping iron will register with the vent-hole, 24, in the can-cap.

A flexible tube, 25, is connected with the burner tube, 26, of the tipping iron and serves to supply the latter with fuel by which the iron is heated.

From the foregoing description it is to be understood that the can conveyer and the crank-shaft are to have a like movement,—that is, if the conveyer moves continuously the crank-shaft will also revolve continuously and if an intermittent movement is employed in the conveyer a like movement will be imparted to the crank-shaft.

If in the operation of the machine a continuously moving conveyer is employed to carry the cans without interruption the crank shaft will also move continuously and the bar, 12, will be made to travel through a complete circuit and will not make a mere reciprocating movement, because it returns to meet a can through a different path from that through which it travels with the can. In one complete revolution of the crank-shaft the bar will travel through substantially an elliptical circuit as can be read in Figs. 1 and 4 of the drawings.

Figs. 1 and 2 show the iron in register with the can and ready to make its forward travel therewith while the solder is applied to the vent hole, 24, of the can-cap. While this movement of the iron and can is taking place other devices are brought into operation to effect the feeding of the solder. These solder-feed devices will now be described.

Secured to the side frame of the machine and projecting horizontally therefrom are two brackets, 28, which sustain vertical posts, 29, at their outer ends. A stationary horizontal plate, 30, is supported at the upper ends of the posts, 29, and a second horizontal plate, 31, is sustained by suitable posts, 32, above the lower plate, 30. An adjustable plate, 33, rests on the top surface of the plate, 30, and the inner end of this plate is provided with a bearing, 34, in which a grooved roller, 35, is mounted so as to revolve in a horizontal plane. The horizontal adjustment of this plate is effected by means of an adjusting screw, 36, at one end and the plate is secured in the adjusted position by means of a locking bolt, 37, which passes through the lower plate, 30.

A ratchet wheel, 38, is also mounted horizontally on a shaft, 39, which has bearing in the two plates, 30, and, 31, and said ratchet wheel revolves in the same horizontal plane as the grooved wheel, 35, and in close proximity thereto, leaving sufficient space however for the passage of a strand of wire-solder, 40, as the teeth of the ratchet-wheel contact with it. Intermittent rotations of the ratchet wheel to feed the wire solder, may be accomplished in various ways, but in the construction shown, I employ a reciprocating bar, 41, having a pin, 42, which serves as a pawl to engage the teeth on the wheel to give the latter a partial turn when the bar is reciprocated.

The bar, 41, projects slightly over the flat surface of the ratchet-wheel and is sustained thereby and the pin, 42, projects from the bottom of the bar to engage the teeth of the wheel. A spring, 43, serves to keep the pin, 42, against the ratchet-wheel and also to maintain a longitudinal pull on the bar in direction reversed to that in which the ratchet wheel turns, so that the movement of the bar in one direction will turn the wheel, while the spring will return the bar so the pin can take a fresh bite on the wheel. A vertical rock-shaft, 44, hangs pendently from the upper plate, 31, and the lower end of said shaft is held steady by a bracket, 45, secured to the frame of the machine. A rock-arm, 46, is mounted on the shaft between the two plates, 30, and, 31, and the outer end of said arm is pivotally connected to one end of the bar, 41. In order to intermittently rock the shaft, 44, I provide a curved arm, 47, at the lower end and this arm projects laterally with its end in the path of projections or other devices on the conveyer so that as the conveyer moves forward the arm will likewise be swung forward and the reciprocating bar will be moved in a reverse direction and against the action of the spring, 43, which latter will return the parts to their normal positions.

It will be noted that in the present construction the solder feed devices are operated by the intermittent contact of the arm, 47, with the successive can-seats on the conveyer, but it is to be understood that the operation of this arm may be effected by properly-spaced projections on the conveyer instead of by can-seats.

It will also be seen that in the present construction the reciprocation of the bar, 41, takes place whether there are cans on the seats or not, and while this is not essential to the invention, because the arm could be positioned on the rock-shaft so as to be operated by contact with the can-body, I prefer to have a positive operation such as has been described.

As it is desirable to avoid feeding solder during the absence of a can I have provided devices to effect this result as will now be described.

A vertical shaft, 48, passes through the plates, 30, and, 31, in which it has bearing, and beneath the plate, 30, this shaft carries an arm, 49, whose end, 50, extends out over the conveyer and in the path of the cans traveling therewith. The upper end of the shaft, 48, carries a collar, 51, from which two arms, 52, and, 53, project. A spring, 54, has one end connected to the arm, 52, and its other end secured to a stationary part of the machine so as to exert a constant rotary pull on said shaft to keep the free end, 50, of the arm, 49, projected over the conveyer. The arm, 53, also projects from the collar on the shaft, 48, and by contact with the ratchet-wheel bearing on top of the plate, 31, will limit the rotation of the said shaft and the outward swing of the arm, 49, over the conveyer.

The shaft carries a trip arm, 55, at its upper end and this arm has position on the shaft so as to project from between the plates, 30, and, 31, and in the same plane with the reciprocating bar, 41. When the arm, 49, swings outwardly over the conveyer because of the absence of a can the shaft, 48, will turn and throw the outer end of the trip arm, 55, against the reciprocating bar, 41, and thus cause the free-end of said bar to move away from the ratchet wheel. As long as the bar, 41, is held away from the ratchet wheel its reciprocations will be made without turning the ratchet wheel, and thus the feeding of solder will be avoided. As soon as the can arrives at the end, 50, of the arm, 49, the reciprocating bar, 41, will again move into operative position with the ratchet wheel. A pawl, 56, serves to keep the ratchet wheel from moving backward while the bar, 41, is reciprocating. A stop, 57, is mounted on the bracket, 28, and limits the movement of the rock-arm, 46.

Having thus described my invention what I claim as new and desire to secure by Letters Patent is,—

1. A can-cap soldering machine having a conveyer to move the filled cans on their ends with their cap-ends uppermost, a soldering iron support extending in the same direction as and reciprocable lengthwise over the conveyer, a soldering iron sustained between the two ends of the support and depending therefrom, means for moving the support lengthwise with the conveyer to seat the iron on the upright can, means for raising the iron from the can, means for reversing the lengthwise movement of the support, and means for lowering the iron.

2. A can-cap soldering machine having a conveyer to move the cans in a straight line and at uniform distances apart, a soldering iron maintained in a pendent position over the center of the line of cans, means for moving the iron in one horizontal plane while operating on the can-cap, means for raising the iron at the end of the soldering period, means for reversing the direction of movement of the iron and means for lowering the iron onto another can at the end of the reverse movement.

3. A can-cap soldering machine having means to move the cans on their ends; an iron support; an iron carried vertically by and depending from the support; a centering device having a fixed relation with respect to the iron and moving with the latter for centering the cap-end of the can with respect to the iron, and means for moving the vertical iron and centering device in one direction to meet a can and then in a reverse direction while in contact with the can.

4. A can-cap soldering machine having a device to support and move the cans on their ends, a depending soldering iron above the cap-end of the cans; iron-carrying means movable in a complete circuit while maintaining the iron vertically above the cap-ends of the cans, and means depending in front of the iron for engaging a can and centering the latter with respect to the iron.

5. A can-cap soldering machine having means to convey the cans with their cap-ends uppermost; an iron-support; a stem depending from said support and carrying an iron at its lower end; means depending from above the can for engaging the rim edge thereof to center the cap with respect to the iron, and means for moving the support and iron in one direction to meet a can and then reverse their movement and cause them to travel with the can while the iron is operating on the cap of the centered can.

6. A can-cap soldering machine having a continuously moving conveyer to move the cans on their ends, a soldering iron maintained in a centered position over the conveyer; means for moving the iron continuously back and forth over the conveyer independently of the cans and irrespective of the presence of a can, means for lowering the iron onto a can to solder the cap of the latter and means for raising the iron from the soldered cap.

7. A can-cap soldering machine having a continuously moving conveyer to move the cans while on their ends, a soldering iron maintained in a definite vertical plane over the conveyer; a can centering device carried with and projecting downwardly at the side of the iron; means independent of the cans for moving the iron and centering device continuously,—said means giving the iron and centering device a movement in a horizontal plane while in contact with the can and then raising and reversing the movement of the iron and centering device to enable them to meet another can.

8. A can-cap soldering machine having a can conveyer to sustain the filled cans on their ends; a support extending lengthwise of the conveyer; a soldering iron depending from and between the ends of the lengthwise support and centered over the ends of the cans and means for lowering the iron onto the end of a can and moving it with the can.

9. A can-cap soldering machine having a can conveyer to sustain and move the filled cans on their ends; a support extending lengthwise of the conveyer; a soldering iron depending from and between the opposite ends of the lengthwise support,—said support and depending iron being held against lateral movement; means for moving the support lengthwise with the conveyer to carry the iron with the can and means to move the support in a reverse direction to that in which the conveyer moves to return the iron to meet another can.

10. A can-cap tipping machine having means to move the cans; a tipping iron; means independent of the can moving means for moving the tipping iron continuously through a circuit; means independent of the iron moving means for feeding solder, and means operative during the absence of a can to prevent the feeding of solder.

11. A can-cap tipping machine having a movable carrier, a bar above the carrier and having a slot; a tipping iron carried by the bar; a crank having a pin which projects into the slot of said bar to move the latter through a complete circuit when the crank is turned, and a solder-feed device.

12. A can-cap tipping machine having a device to sustain the cans; a bracket having slotted ends; a bar movable through the slots in said bracket ends; a crank revolving in engagement with the bar; a tipping iron carried by said bar, and a solder-feed device.

13. A can-cap tipping machine having a conveying device to move the cans; a tipping iron; means for moving the iron with one can and then returning it to meet the next can; a solder-feed device operated by the conveyer, and a device held inoperative by the cans to permit the solder-feed device to operate.

14. A can-cap tipping machine having a device to move the cans; a tipping iron; means independent of the can-moving device for moving the iron with the cans; a solder-feed wheel; a continuously reciprocating solder-feed bar, and means operated by the cans to enable the reciprocating bar to engage the feed-wheel.

15. A can-cap tipping machine having a conveying device to move the cans; a tipping iron; means for moving the iron continuously in a direction parallel with the conveying devices; a solder-feed wheel; a reciprocating solder-feed bar; means operated by the conveyer for reciprocating the bar continuously, and means operated during the absence of a can to prevent the reciprocating feed-bar from operating the feed-wheel.

16. A can-cap tipping machine having a movable can-carrier; a tipping iron sustained above the carrier; a plurality of centering pins in advance of the iron; means for moving the iron and pins with the cans, and a solder feed device.

17. A can-cap tipping machine having a movable can-carrier, a tipping iron sustained above the carrier; a plate projecting in advance of the iron; a plurality of pins sustained by said plate; means for causing the plate, pins and iron to travel with the can and a solder feed device.

18. In a can-cap soldering machine the combination with a conveyer having a plurality of disks attached thereto at regular intervals apart and each disk being horizontally disposed to receive and convey a filled can with its cap-end uppermost, of a soldering iron maintained in a pendent position in a vertical plane over the centers of the moving disks and means for moving the iron in one direction while centered over a disk and then returning it to meet another disk.

19. In a can-cap soldering machine the combination with a plurality of horizontal disks at regular intervals apart and adapted to carry filled cans with their cap-ends uppermost, of means for moving the disks forward; a soldering iron pendently sustained over the vertical centers of the disks; means for advancing and lowering the iron over the center of one disk while the latter is moving to effect the soldering of the can cap and means for raising the iron with respect to the disk at the end of the soldering period and reversing its movement to enable it to meet and center over another disk and can thereon.

20. In a can-cap soldering machine the combination with a series of horizontal can disks movable at regular intervals apart and adapted to cary filled cans with their cap-ends uppermost, of soldering-iron support extending lengthwise with respect to the direction of travel of the disks; a soldering iron depending from the support between the ends of the latter and maintained in a vertical plane over the centers of the moving disks, and means for moving the iron-support lengthwise back and forth above the disks to cause the iron to center over and travel with one disk and then return to meet another disk.

21. In a can-cap soldering machine the combination with a conveyer to move the cans with their cap-ends uppermost, of a soldering iron depending over the conveyer; means for moving the iron back and forth over the conveyer; a solder feed wheel to engage and feed the solder toward the iron; a reciprocating feed bar to engage and turn the wheel, and means operated by the cans to move the bar into engagement with the feed wheel.

22. In a can-cap soldering machine the combination with a conveyer to move the cans with their cap-ends uppermost, of a soldering iron depending over the conveyer; means for moving the iron back and forth over the conveyer; a solder feed wheel to engage and feed the solder toward the iron; a reciprocating feed bar to engage and turn the wheel; means for reciprocating the feed bar continuously, and means movable over the conveyer during the absence of a can to throw the feed bar out of engagement with the feed wheel to permit it to reciprocate without feeding the solder.

23. In a can-cap soldering machine the combination with a plurality of spaced-apart can supporting disks movable continuously in a horizontal plane, of a soldering iron above the disk; means for moving the iron back and forth over the disks; a solder feed wheel to engage and feed the solder into the path of the iron; a reciprocating feed bar to engage the feed wheel; means projecting into the path of the moving disks for intermittently reciprocating the feed bar and means movable over the said disks during the absence of a can to throw the bar out of engagement with the feed wheel.

In testimony whereof I affix my signature in presence of two witnesses.

CHARLES H. AYARS.

Witnesses:
   JONATHAN W. ACTON,
   BENJAMIN E. HARRIS.